US008855471B2

(12) United States Patent
Stone

(10) Patent No.: US 8,855,471 B2
(45) Date of Patent: Oct. 7, 2014

(54) MEDIA GENERATION SYSTEM

(75) Inventor: Jonathan James Stone, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 1895 days.

(21) Appl. No.: 12/022,626

(22) Filed: Jan. 30, 2008

(65) Prior Publication Data

US 2009/0103889 A1 Apr. 23, 2009

(30) Foreign Application Priority Data

Feb. 27, 2007 (GB) .................................. 0703770.8

(51) Int. Cl.
```
G11B 27/00      (2006.01)
G06F 3/00       (2006.01)
H04N 7/167      (2011.01)
G11B 27/034     (2006.01)
G06F 17/30      (2006.01)
H04N 19/00      (2014.01)
G11B 27/031     (2006.01)
G11B 27/32      (2006.01)
H04N 5/247      (2006.01)
H04N 21/472     (2011.01)
```
(52) U.S. Cl.
CPC ........ *G11B 27/034* (2013.01); *G06F 17/30843* (2013.01); *H04N 7/26* (2013.01); *G11B 27/031* (2013.01); *G06F 17/30817* (2013.01); *G11B 27/32* (2013.01); *G06F 17/30017* (2013.01); *H04N 5/247* (2013.01); *H04N 21/47202* (2013.01)
USPC ........... 386/278; 715/704; 715/720; 715/723; 725/32

(58) Field of Classification Search
USPC ........................................................ 386/55
See application file for complete search history.

(56) References Cited

U.S. PATENT DOCUMENTS

| 5,828,809 A | * | 10/1998 | Chang et al. | ............... | 386/241 |
|---|---|---|---|---|---|
| 6,278,446 B1 | * | 8/2001 | Liou et al. | ................... | 715/700 |
| 6,360,234 B2 | * | 3/2002 | Jain et al. | ..................... | 715/201 |
| 6,772,125 B2 | * | 8/2004 | Harradine et al. | ........... | 704/278 |

(Continued)

FOREIGN PATENT DOCUMENTS

| CN | 1457596 A | 11/2003 |
|---|---|---|
| CN | 1627813 A | 6/2005 |

(Continued)

OTHER PUBLICATIONS

Chinese Office Action issued Dec. 6, 2010, in Patent Application No. 200810082511.7 (with English-language translation).

*Primary Examiner* — Fatoumata Traore
(74) *Attorney, Agent, or Firm* — Oblon, Spivak, McClelland, Maier & Neustadt, L.L.P.

(57) ABSTRACT

A system generates automatically a highlight summary of a performance, from signals representing a captured version of the performance. The system includes a user operated event logging processor and an ingestion processor. The user operated event logging processor is operable to log event codes, each of which is selected by the user from a set of event codes. Each of the event codes in the set of event codes represents a predetermined event which may occur in the performance, the event codes being selected by the user when an event corresponding to the event code occurs during an observed performance. The ingestion processor is operable to receive the event codes and to receive signals produced by capturing a representation of the performance.

11 Claims, 6 Drawing Sheets

(56) References Cited

U.S. PATENT DOCUMENTS

| | | |
|---|---|---|
| 6,795,638 B1 | 9/2004 | Skelley, Jr. |
| 7,548,565 B2 * | 6/2009 | Sull et al. ............... 370/503 |
| 7,685,202 B2 * | 3/2010 | Kasahara et al. ............ 707/758 |
| 7,930,419 B2 * | 4/2011 | Mullig et al. ............... 709/231 |
| 8,631,226 B2 * | 1/2014 | Rachamadugu ............... 713/100 |
| 2002/0152082 A1 * | 10/2002 | Harradine et al. ............ 704/278 |
| 2003/0177503 A1 * | 9/2003 | Sull et al. ............... 725/112 |
| 2003/0189589 A1 * | 10/2003 | LeBlanc et al. ............. 345/723 |
| 2004/0017389 A1 | 1/2004 | Pan et al. |
| 2004/0109674 A1 | 6/2004 | Ohmori |
| 2004/0167767 A1 | 8/2004 | Xiong et al. |
| 2004/0263529 A1 | 12/2004 | Okada et al. |
| 2006/0104600 A1 * | 5/2006 | Abrams ...................... 386/46 |
| 2006/0222337 A1 | 10/2006 | Fujikawa et al. |
| 2006/0280365 A1 | 12/2006 | Gong et al. |
| 2007/0143493 A1 * | 6/2007 | Mullig et al. ................ 709/232 |
| 2008/0052315 A1 * | 2/2008 | Kasahara et al. .......... 707/104.1 |

FOREIGN PATENT DOCUMENTS

| | | |
|---|---|---|
| EP | 1 286 516 A2 | 2/2003 |
| EP | 1 531 626 A1 | 5/2005 |
| JP | 2005-143143 | 6/2005 |
| WO | WO 03/015403 A2 | 2/2003 |
| WO | WO 2005/057931 A2 | 6/2005 |

* cited by examiner

| EVENT CODE | | IMPORTANCE | ACTION | |
|---|---|---|---|---|
| GOAL | → 000 | 1 | ± 15secs | 3 CAMERAS +1 SLOW MOTION |
| SHOT ON GOAL | → 001 | 2 | ± 10secs | 2 CAMERAS |
| FOUL | 010 | 3 | ± 5secs | 1 CAMERA |
| OFF-SIDE | 011 | 3 | ± 5secs | 1 CAMERA |
| SUBSTITUTION | 100 | 3 | ± 5secs | 1 CAMERA |
| FREE KICK | 101 | 2 | ± 10secs | 2 CAMERAS |
| YELLOW CARD | 110 | 3 | ± 5secs | 1 CAMERA |
| PENALTY | 111 | 1 | ± 15secs | 2 CAMERAS +1 SLOW MOTION |
| -- | -- | | | |

MEDIA GENERATION SYSTEM

FIELD OF THE INVENTION

The present invention relates to systems for generating automatically a highlight summary of a performance from signals representative of that performance. In some examples, the highlight summary may be generated from a recording of the performance.

BACKGROUND OF THE INVENTION

It is known to produce a highlight summary of a live performance by recording that performance using television cameras and/or microphones and then editing the recording of the live performance to produce a shortened version of the recording which concentrates on key events which have taken place during the performance. For example, if the performance is a sporting event such as a rugby or football match then an edited version is typically produced from a continuous recording of the entire match to form a highlight. The highlight summary may be produced by taking sections of the continuous recording associated with key events such as a goal, penalty or a try and forming the recorded events into a contiguous recording to produce a summarised highlight of the match.

SUMMARY OF THE INVENTION

According to the present invention, there is provided a system for generating automatically a near-live highlight summary of a live performance, the system including a user operated event logging processor and an ingestion processor. The user operated event logging processor is operable to log event codes, each of which is selected by the user from a set of event codes. Each of the event codes in the set of event codes represents a predetermined event which may occur in the live performance, the event codes being selected by the user when an event corresponding to the event code occurs during the observed live performance. The ingestion processor is operable to receive the event codes and to receive live-feed signals representative of the live performance produced by capturing a representation of the live performance. The ingestion processor compares the event codes with an editing action list, the editing action list specifying for each of the set of event codes at least an amount of the live performance which should be included in an automatically generated near-live highlight summary of the live performance, and generates automatically the near-live highlight summary of the performance by including the amount of the live-feed signals representative of the live performance in the near-live highlighted summary in accordance with the amount specified by the editing action list for the event code.

New media formats such as IPTV and mobile TV provide a conduit for presenting highlight summaries of live performances such as sports matches. A technical problem addressed by the present invention is to provide an arrangement for efficiently generating a near live highlight of a live performance as efficiently as possible. It is known to record events which occur within a live performance using one or more camera recorders. However, with known systems a significant effort is required and delay incurred between the acquisition of the content and providing content highlights. For larger sports venues, an investment required to produce such highlights can justify an investment which is required. However, for smaller venues, such investment is less attractive.

Embodiments of the present invention provide an arrangement in which metadata in the form of event codes are logged by an operator during a live performance. The event codes represent predetermined events within the live performance. Furthermore, an editing action list is defined in which each of the edit codes has specified therein editing actions which are to be performed to form the edited highlights automatically. The event codes could be applied to a live feed, with a buffer to store an amount of the performance which occurred before the event code was selected or to a recording of the live performance. Thus, by applying the editing action list to the event codes, an ingestion processor can automatically generate near live highlights of a performance which can be more rapidly generated for conveying by new media formats such as for downloading over the web for IPTV or streaming to mobile communications terminals for mobile TV. As such the live-feed, which can represent real-time video and/or audio captured from the performance can be used to generate a near-live highlight summary of the performance.

The application of the event codes to the representation of the live performance, to form the near-live highlight summary of the performance, should not be interpreted as implying that the live performance should be recorded, after which the event codes are applied to produce the highlight summary. In some embodiments, the event codes may be applied to a live feed of a representation of the performance captured by devices such as cameras to provide a near live highlight summary. However, in order to include extracts of the performance which have occurred before an event code is selected, it may be necessary to retain a certain amount of the performance in a period before the event code is selected. Thus in this sense the representation of the performance is buffered for a maximum temporal period so that this maximum temporal period could be included within the highlight summary, in addition to an amount of the performance which occurred after the event code was selected.

Various further aspects and features of the present invention are defined in the appended claims.

BRIEF DESCRIPTION OF THE DRAWINGS

Embodiments of the present invention will now be described with reference to the accompanying drawings in which like parts are referred to with the same alphanumeric designations and in which.

DESCRIPTION OF EXAMPLE EMBODIMENTS

An example embodiment of the present invention will now be described with reference to generating a highlight summary of a football match from camera recordings of that football match. However, as indicated above, a football match is just one example of a live performance and the present invention finds application with other sports and other types of live public performance such as theatre performances, music performances, and other performances where highlights may be generated such as nature research and natural events, etc.

FIRST EXAMPLE

Highlight Generated from a Recording

Figures 1, 2:
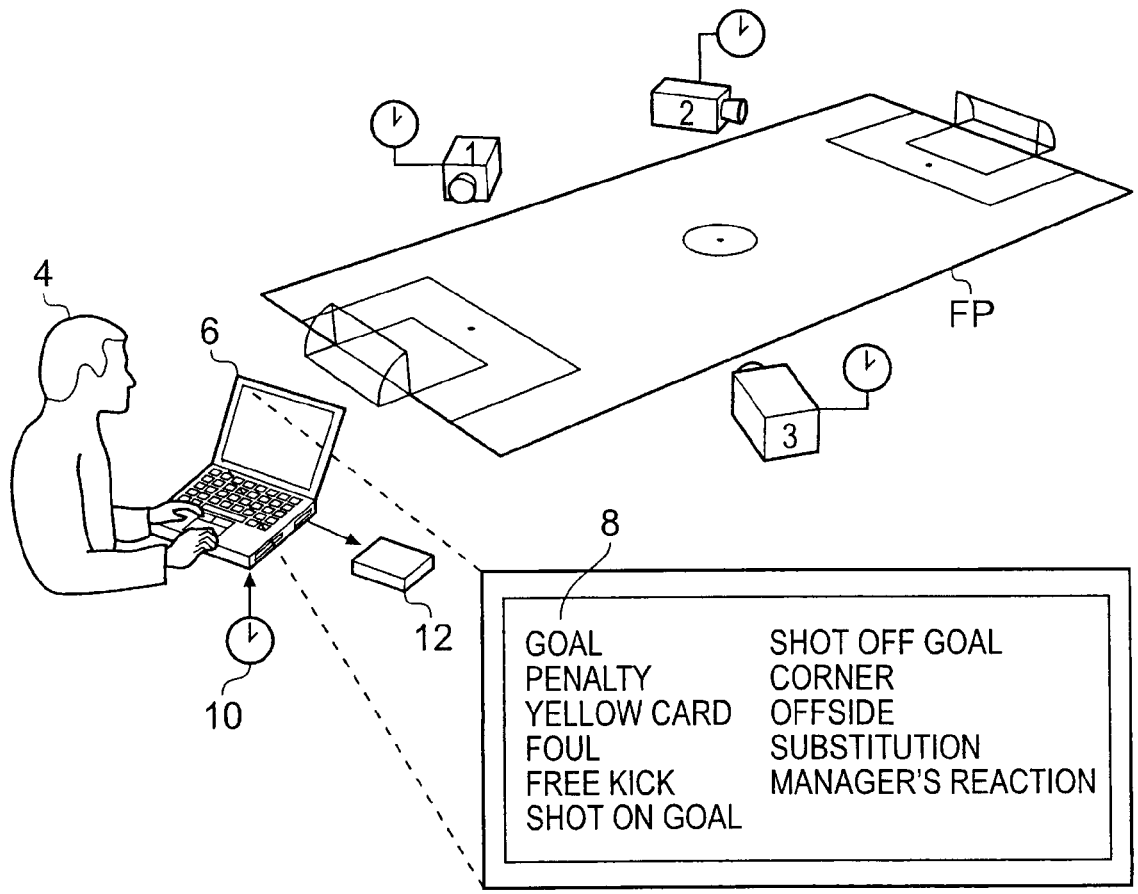
FIG. 1 is a schematic representation of a system according to the present technique which generates automatically highlights of a sporting event such as, in this example, a football match.
FIG. 2 is an example representation of an event log for a football match.

In FIG. 1, a football match is represented by a football pitch FP. Camera recorders 1, 2, 3, are shown disposed with respect to the football pitch FP and are used by operators or are arranged automatically to record continuously the football match which typically would be the entire football match although it would be appreciated that small interruptions may occur. Contemporaneously with the recording of the football match an operator 4 observes the football match and using an event logging processor system 6, selects one or more of a plurality of predetermined event codes, forming a set, to represent events that may occur within a football match. These are shown in an expanded view within a table 8 and include such things as "goal", "penalty", "yellow card", "foul", etc. Thus, throughout the duration of the match, when a corresponding event occurs in the match, such as a goal, the operator 4 selects the "goal" event and a corresponding event code representing that event is recorded in an event log with respect to time generated by a clock 10. The event log is then recorded on an appropriate medium, for example, a flash memory 12. Also recorded in the event log is a time reference, which identifies when the event represented by the event code was logged. This time reference could be real-time, a time code or a time from the start of the match (match clock). As such, in one example, the reference time in the event log may be generated automatically, with the match clock being reset at the start of the match.

FIG. 2 provides a representation of an event log for a football match. In FIG. 2, the event log is divided into two halves 20, 22 to represent the two halves of the football match. In the first half 20 a left-hand column 24 identifies events which occurred during the match and a right-hand column 26 shows a time at which those event codes were logged in the event log. Correspondingly, in the second half 22, a left-hand column 27 illustrates the event codes which were logged and the right-hand column 28 illustrates a time at which those event logs occurred.

Figures 3, 4:
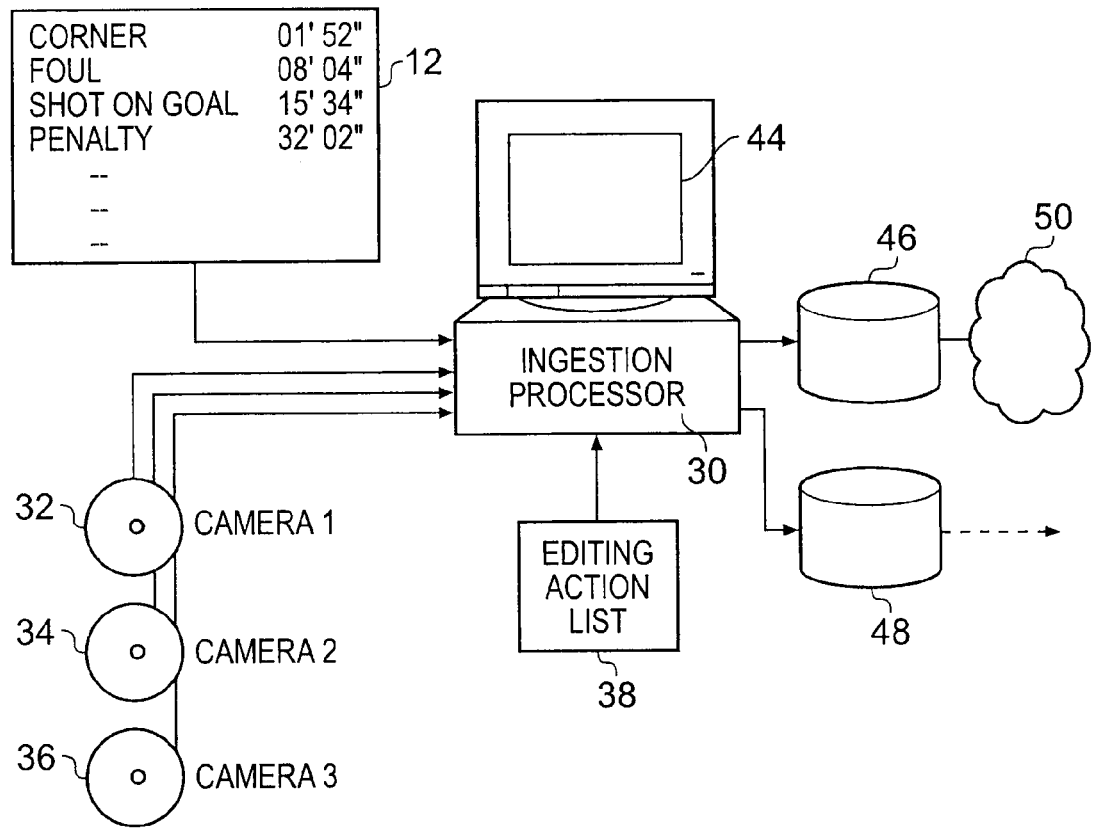
FIG. 3 is a schematic block diagram of an ingestion processor which is arranged to received an editing action list, continuous recordings from three cameras and an event log.
FIG. 4 is an example representation of an editing action list specifying actions for each of one or more predetermined event codes.

FIG. 3 provides a schematic illustration of a part of the system which is used for generating the highlight summary of the football match. In FIG. 3, an ingestion processor 30 is arranged to receive the event log, for example, in a form of the flash memory 12 and is also arranged to receive the recording of the football match from each of the cameras 1, 2, 3, for example in the form of recorded DVD's 32, 34, 36. Also received by the ingestion processor 30 is an editing action list 38, although this may have already been preloaded into the ingestion processor 30. The editing action list 38 specifies for each of the possible event codes which the operator 4 may have selected during the football match, actions which are to be performed on the recording or recordings of the football match to produce automatically the highlight summary of the football match.

As already explained above, the event log includes event codes and a time at which the corresponding events represented by those event codes occurred in the football match. Correspondingly, when the cameras, 1, 2 and 3 recorded the football match, the recordings may be generated with respect to a temporal reference such as a match clock or real time. Thus, as a first operation the ingestion processor aligns the time reference with respect to which the event codes were logged with respect to the match clock used as a temporal reference for the continuous recordings produced by the cameras 1, 2 and 3. If the event code and the recordings were made with respect to the same temporal reference such as a match clock or real-time, then this temporal alignment may not be necessary since the accuracy of the time of recording the event codes with respect to the time of the recording the performance need not be high. The ingestion processor then reviews the event log and for each event code which is identified by sequentially parsing the event log, performing appropriate actions specified by the editing action list 38 to take corresponding sections of the recording produced by each of the cameras identified as corresponding to the time at which the event code was logged with respect to the time of the recording and providing a corresponding section of the recording to form an edited highlight summary automatically. FIG. 4 provides an example of the editing action list 38.

In FIG. 4, a first column identifies the event with a code for that event. For example, the event "goal", corresponds to a code 000 and the event "shot on goal" corresponds to the code 001. In a second column 42, a relative importance is provided to the event code which may be used as a hierarchical arrangement for arranging the logged events in a form other than a sequential order corresponding to a time at which the events were logged. In the third column 43 an action is specified. The action is an editing action corresponding to at least an amount of the recording from one or more of the cameras which is to appear in the automatically generated highlight summary. In order to show, for example, both the build up to a goal and the celebrations after the goal has been scored, an amount of time is specified either side of a time at which the event is logged. So, for example, for the event "goal" which is provided with an importance 1, then 15 seconds either side of the time of the logged event code is taken from the continuous recording from one or more of the cameras and used to form the highlight summary.

Furthermore, as illustrated in FIG. 3, since recording of the match is captured by three cameras, then the action list may specify how many cameras are to be used to cut sections of the continuous recording into the highlight summary. Furthermore, in other examples, the editing action may indicate that one of the recordings is to be formed as slow motion in the highlight summary. Thus, as shown in FIG. 4 for each of the event codes, an importance is provided and in correspondence with that importance, a relative amount of the recorded performance is cut into the edited highlights. For more important events, this is done for more than one camera, so that, for example, for a "shot on goal", the importance level is given as 2 with plus or minus 10 seconds either side of the time of the recorded event code for each of two cameras.

Returning to FIG. 3, the ingestion processor is provided with a display screen 44 which can be used to view the automatically generated highlight summary. The automatically generated highlight summary may then be transferred to an appropriate access format such as a web server 46 or a streaming server 48. For the streaming server 46 the highlight summary is stored in a way which can allow internet access by a connection 50 so that users may log into the web server 46 to download the edited highlight summary to review the highlights of the match. For the example of the streaming server 48 the edited highlight summary is provided in a format in which this can be streamed on demand to, for example, mobile terminals with an appropriate interface and via an appropriate access network such as the GPRS network.

In other examples, the action list may specify an amount of bandwidth, which should be allocated to the content cut from the continuous recording produced by the cameras into the edited highlight summary in accordance with their relative importance of the those events. If, for example, the edited highlight summary is to be reviewed on a mobile communications terminal then bandwidth for reviewing the streamed highlight summary may be limited. As such, more bandwidth may be allocated to more important events than lesser important events. So, for example, a goal may be streamed with a greater bandwidth, which may take longer to load on a mobile terminal than a foul or an off-side. In other examples, a maximum predetermined duration may be specified for the length of the highlight summary and the amount of the recorded performance, which is included in the highlight summary may be adapted dynamically in accordance with the relative importance in order to include each event within the highlight summary.

Figure 5:
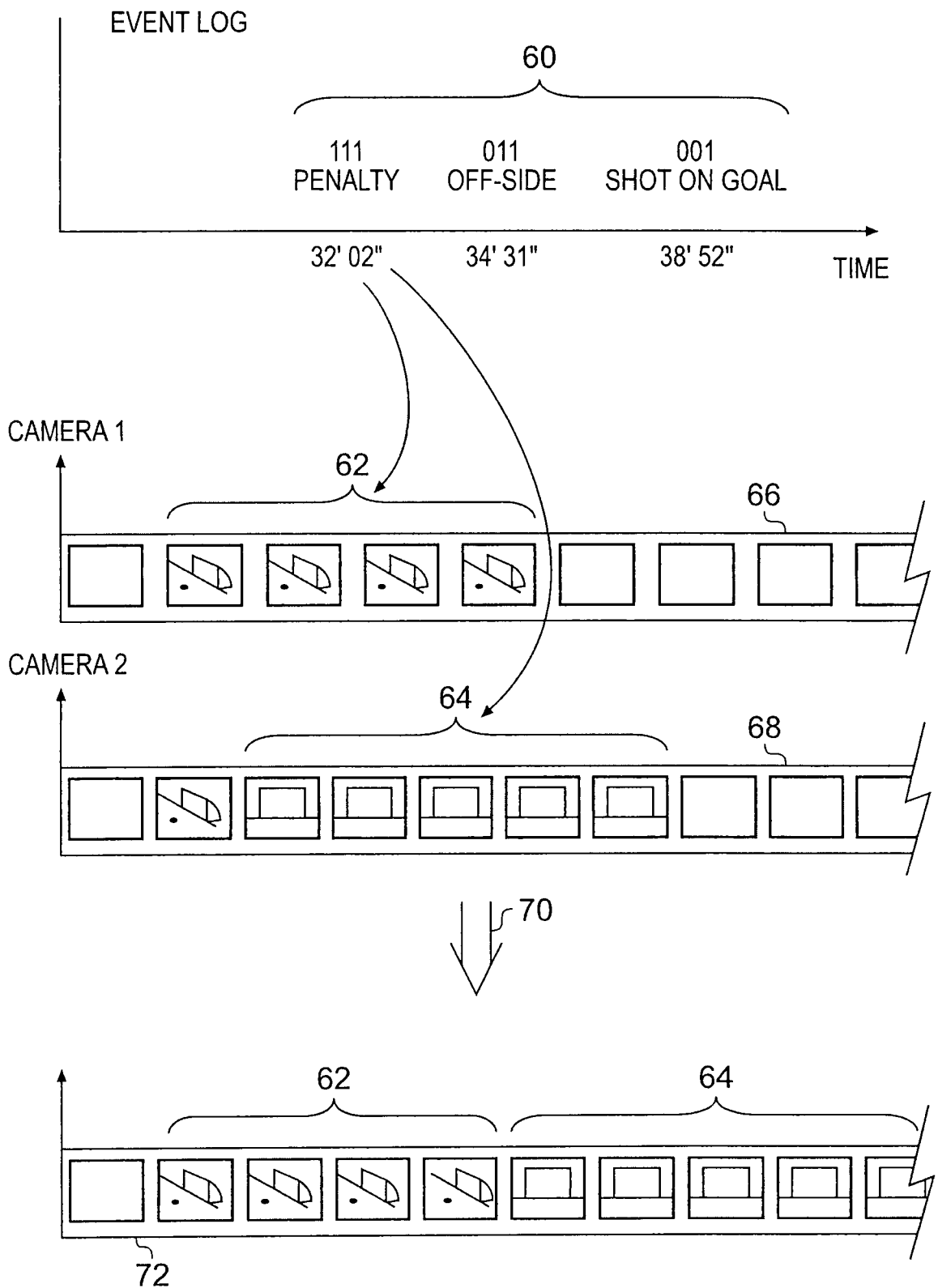
FIG. 5 is a graphical illustration of a process of automatically generating a highlight summary from a plurality of continuous recordings using an event log and the system shown in FIG. 3.

FIG. 5 provides an illustrative representation of the formation of an edited highlight section from an event log when applied to two cameras. In FIG. 5 the event log is shown with event codes 60 positioned with respect to time although it would be appreciated that this is just for illustrative purposes and the ingestion processor 30 would simply search for the appropriate time in the relevant recorded material in order to identify the appropriate section. As shown by an arrow 62 for example, for the event "penalty", the section of the media specified in the action list, which in this case is plus or minus 15 seconds, is selected for each of two cameras as specified for the action list in this example. Thus for the event penalty then 15 seconds of material for cameras 1 and 2 are cut from the continuous recordings 62, 64 from cameras 1 and 2 and as illustrated by an arrow 70 formed into a contiguous section of the highlight summary 72.

Figure 6:
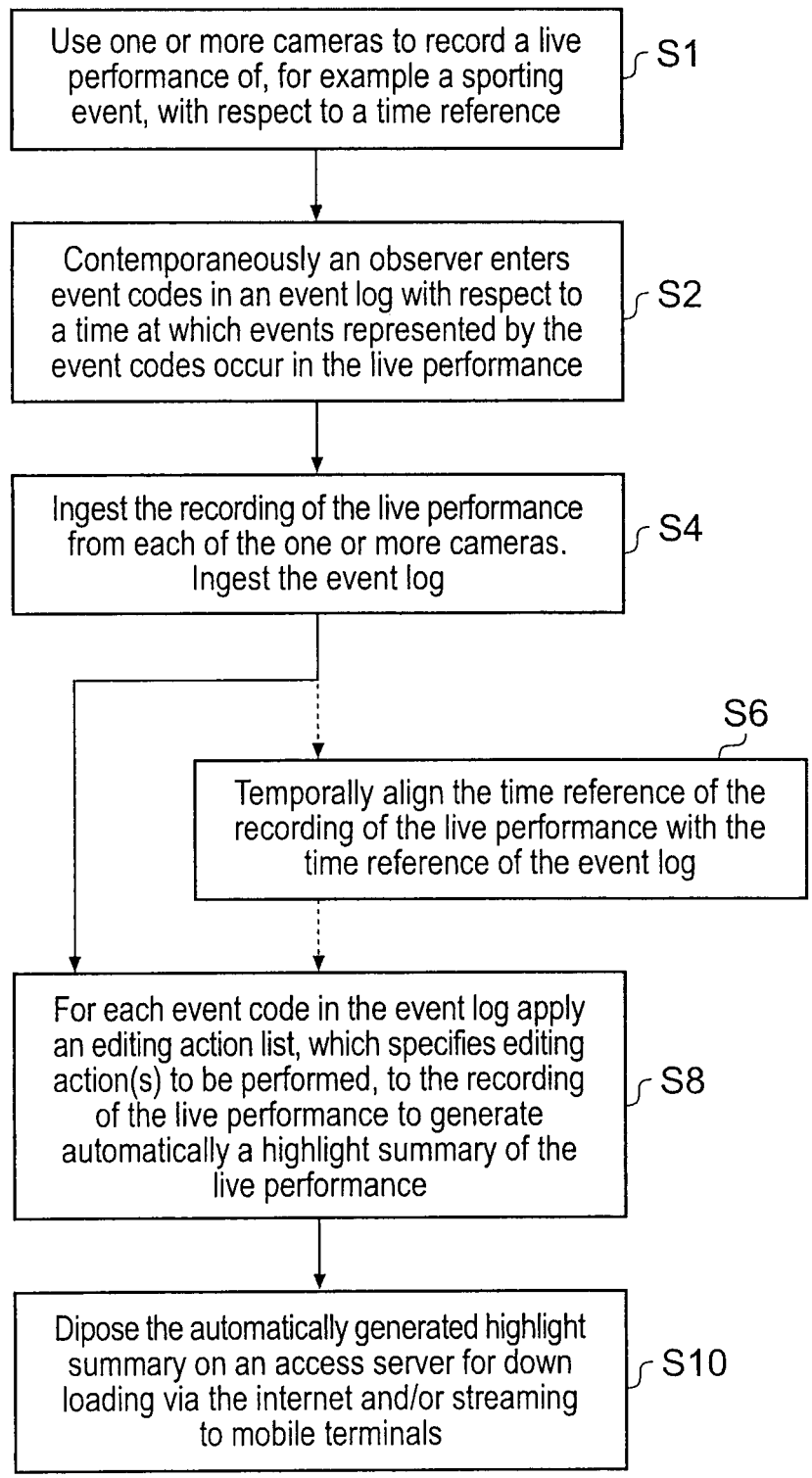
FIG. 6 is an example flow diagram illustrating the operation of the system shown in FIGS. 1 and 3 to produce a highlight summary of a performance from a recording of that performance.

The operation of the system forming automatically a highlight summary of a performance such as a football match is provided in a flow diagram in FIG. 6. FIG. 6 is summarised as follows:

S1—One or more cameras are used to record a live performance, for example, sporting events with respect to time. The recording is made with respect to a temporal reference such as a match clock.

S2—Contemporaneously, an observer of the live performance enters event codes in an event log with respect to a time at which the event represented by the event codes occur in the live performance.

S4—The recording of the live performance from the one or more cameras is ingested into an ingestion processor with an event log.

S6—Optionally, the ingestion processor temporally aligns the time reference or match clock of the recording of the live performance with the time reference in the event log.

S8—For each event code in the event log, an editing action is performed. The editing action is specified with respect to the selected event code in the editing action list. The editing action specifies at least an amount of the recording of the performance from the camera or cameras which is to appear in the highlights of the match. Thus, applying the editing action list to the event codes with the recordings from the one or more cameras, generates automatically a highlight summary of the live performance.

S10—The automatically generated highlight summary is then disposed for access on a server, for example, for downloading via the internet and/or streaming to mobile terminals.

SECOND EXAMPLE

Highlight Formed from a Live Feed

Figure 7:
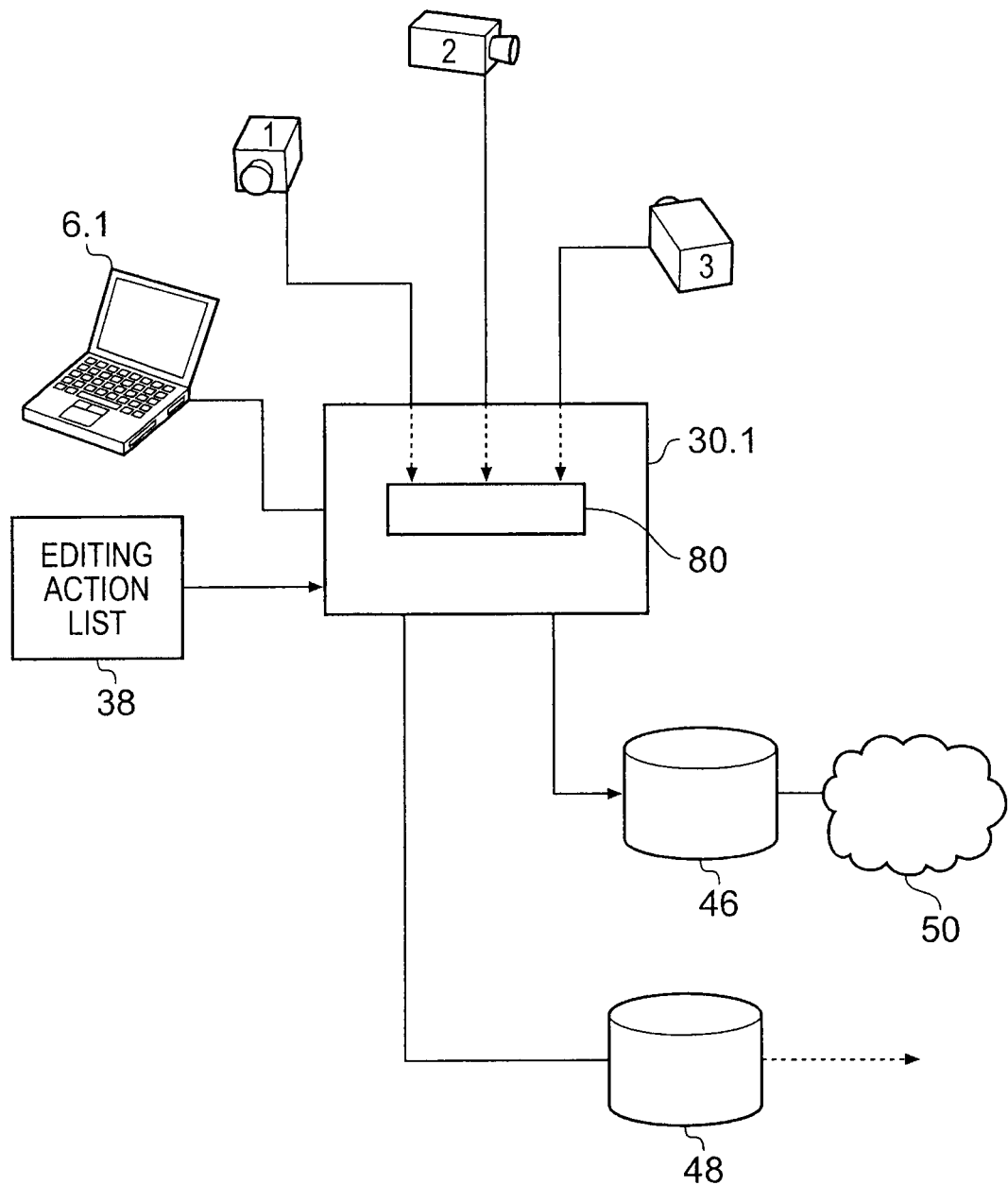
FIG. 7 is a graphical illustration of a second example system for automatically generating a highlight summary of a performance.

A further example system operating in accordance with the present technique is illustrated in FIG. 7. In FIG. 7 a further example of an ingestion processor 30.1 is shown connected to an example of an event logging processor 6.1. The ingestion processor 30.1 and the event logging processor 6.1 operate substantially in accordance with the first example shown in FIGS. 1 and 2 to produce automatically a highlight summary of a performance in accordance with the present technique. As for the first example the event logging processor 6.1 provides a user with options for selecting event codes from a predetermined set of event codes as explained and illustrated above with reference to FIGS. 1, 2 and 3. However, unlike the example shown in FIGS. 1, 2 and 3, the example in FIG. 7 provides an arrangement in which the three example cameras 1, 2, 3 feed live captured audio and video signals representative of the performance into the ingestion processor 30.1 without being recorded. Correspondingly, when a user selects an event code having observed a corresponding event in the performance, the event code is communicated from the event logging processor at 6.1 to the ingestion processor 30.1 without being recorded. Thus, with the example shown in FIG. 7 an event log is not necessarily formed but the event codes are applied in real time to the audio and video signals provided from the cameras 1, 2 and 3 in order to form a near live highlight summary of the performance. In this sense, the event logging processor is operable to communicate selected event codes to the ingestion processor without storing the event codes.

As with the example shown in FIGS. 1, 2 and 3 an editing action list is provided to the ingestion processor 30.1 which specifies editing operations to be performed to the effect of taking the live audio and/or video signals and recording or buffering selectively parts of the signals to form the highlight summary of the performance.

In order to allow an event code to specify both a section of the performance to be used in the highlight summary going forward in time and to include a section of the performance leading up to a time when that event occurred, a storage buffer 80 is used to store a predetermined amount of signals representative of the past passage of the performance which is subsequently overwritten after a predetermined maximum passage of time has elapsed. Therefore when a user selects an event code, the event code is communicated without delay to the ingestion processor which receives the event code and applies a corresponding action specified in the editing action list for that event code to the received audio and/or video signals. A representation of the performance corresponding to those audio/video signals for that event is included in the highlight summary, in accordance with the specified editing action for the event code defined in the editing action list. If for the event code, the editing action lists specifies that a predetermined passage of the performance before and after a time at which the event code is received is to be included into the edited highlight summary, then an amount of signals after that point in time are included in the highlight summary and signals within the temporal buffer 80 before the edit code is received are also included in the highlight summary.

As for the example shown in FIG. 3, the signals representing the highlight summary are fed to the web server 46 and the streaming server 48 which are used to make the editing highlight summary available to client devices connected to a client via an internet connection or to mobile communications devices.

Figure 8:
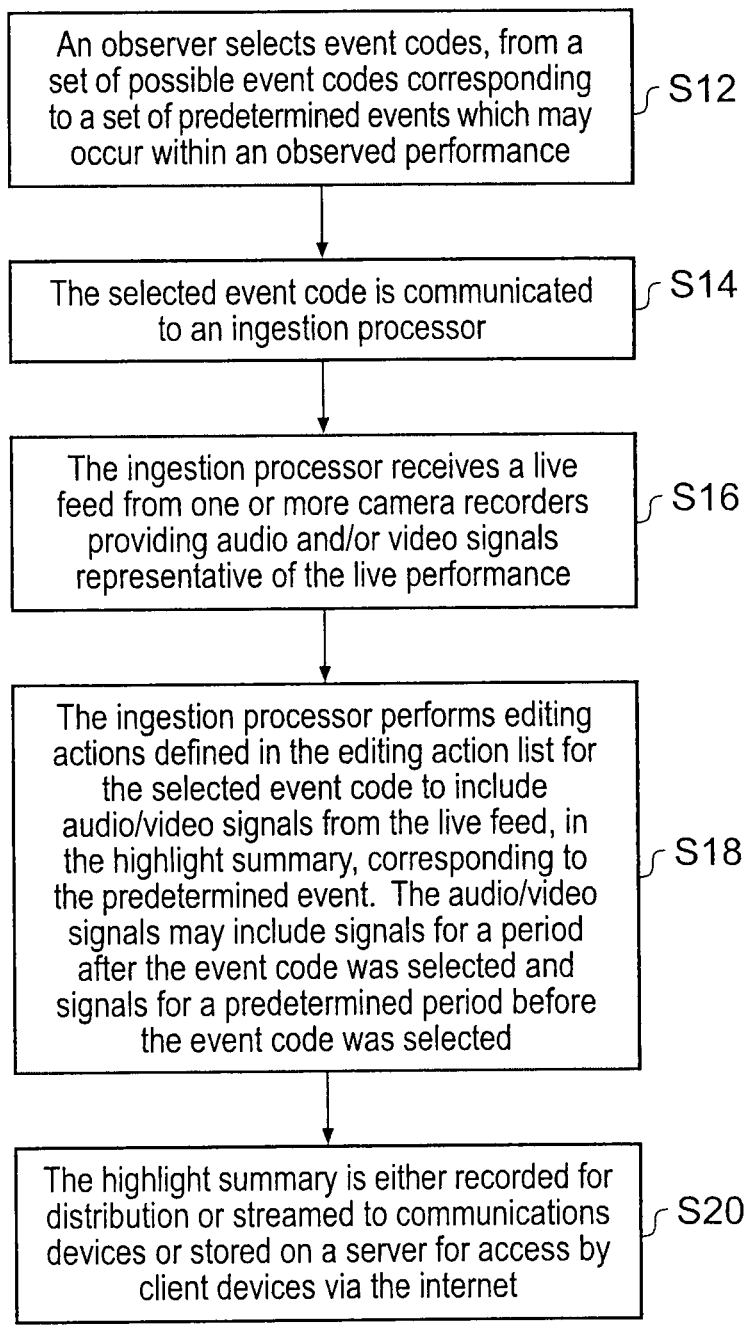
FIG. 8 is an example flow diagram illustrating the operation of the system shown in FIG. 7 to produce a highlight summary of a performance from a live feed.

A summary of the operation of the example shown in FIG. 7 is provided by a flow diagram shown in FIG. 8. The steps of the flow diagram shown in FIG. 8 are summarised as follows:

S12—An observer selects event codes using an event logging processor from a set of possible event codes, which correspond to a set of possible predetermined events which may occur within the observed performance.

S14—The selected event code is communicated without delay to an ingestion processor.

S16—The ingestion processor receives a live feed from one or more camera recorders providing audio and/or video signals representative of the live performance.

S18—The ingestion processor then performs editing actions which are defined for the selected event code in an editing action list. Thus, the selected event code is compared to the editing action list and the action specified in the editing action list are performed on the audio and/or video signals received from the one or more camera recorders. In accordance with the action specified, for example, audio and/or video signals for a period after the event code was selected are included in the highlight summary and audio and/or video signals which were received before the event code was selected for a predetermined past passage of time are included in the highlight summary.

S20—The highlight summary formed by applying the event codes to the live feed from the camera recorders are either recorded or streamed to client devices or communications terminals with an appropriate buffer to provide a contiguous set of selected events forming a near live highlight summary of the performance.

In accordance with this example, a football club could auto-generate a highlight package every 30 minutes for example.

In other implementation examples the live performance may be recorded and the event codes may be applied to the recorded performance. As such, other implementation examples an event logging processor may be operable to record a reference time at which the event code is selected by a user, the event codes and the time reference at which event codes are selected by the user being recorded to form a event log. The ingestion processor may be operable to receive a recording of the performance produced by recording the live-feed signals representative of the performance, and to produce automatically the highlight summary of the performance by applying the event log to the recording of the performance using the editing action list.

For the example implementation, in which the performance has been recorded, the editing action list may specify that for each of the predetermined event codes an amount of the recorded performance which is to be used to form the automatically generated highlight summary, the amount being dynamically varied in accordance with a selected predetermined minimum duration of the highlight summary. Furthermore, the ingestion processor may be operable to align temporally the recording of the performance with the time reference of the event log.

Correspondingly, an implementation of a method of operation may include recording a time reference at which the event code is selected by the user, recording the event codes and the time reference for each selected event code to form a event log. The generating automatically the highlight summary of the performance may also comprise comparing each of the event codes in the event log with the editing action list, receiving a recording of the performance for which the highlight summary is to be generated, and including the amount of the recorded performance in the highlighted summary in accordance with the amount specified by the editing action list for the event code.

Various further aspects and features of the present invention are defined in the appended claims. Various adaptations and modifications may be made to the embodiments of the invention described above while still falling within the scope of the appended claims. For example, other forms of target media format could be used to convey the summary highlights and other ways of editing the recorded material can be envisaged in addition to selecting an amount of the recorded material, a number of different aspects of that material from different capturing apparatus or whether sound or other commentary is included in the edited highlights.

The invention claimed is:

1. A system for generating automatically a near-live highlight summary of a live performance, the system comprising:
   a user operated event logging processor that logs one or more event codes, each of which is selected by the user from a set of event codes, each of the event codes in the set representing a predetermined event that is selectable by the user based on the live performance, and
   an ingestion processor that receives the event codes, receives live-feed signals produced by capturing a representation of the live performance, compares the event codes with a predetermined editing action list, the editing action list specifying for each of the event codes at least a predetermined period of time, and generates automatically the near-live highlight summary of the performance by including the predetermined period of time of the live feed signals representative of the live performance in the near-live highlight summary in accordance with the predetermined period of time specified by the editing action list for the event code based on the comparison,
   wherein the event logging processor logs the one or more event codes in an event log and records a time reference at which the event code is selected by the user,
   the ingestion processor receives the event log including the event codes and the time reference associated with each event code, and generates the near-live highlight summary of the performance by extracting a portion of the live performance before and after the time reference based on the predetermined period of time specified for the event code by the editing action list, and the event log and time reference are stored in memory.

2. A system as claimed in claim 1, wherein the ingestion processor includes a data store that stores, in a buffer, a predetermined amount of the live-feed signals representative of the live performance, the predetermined amount of the stored live-feed signals representing a past section of the live performance with respect to a time when the user selected an event code, the predetermined period of time of the live-feed signals included in the near-live highlight summary of the live performance, specified for at least one of the event codes by the editing action list, including at least some of the live-feed signals stored in the buffer to provide part of the performance before the event occurred.

3. A system as claimed in claim 1, wherein the ingestion processor receives a plurality of live-feed signals representative of the live performance, each of the signals having been generated by capturing a different representation of the live performance, and the editing action list specifies, for one or more of the event codes, a predetermined period of time for one or more of the plurality of live-feed signals which are to appear in the automatically generated near-live highlight summary.

4. A system as claimed in claim 1, further comprising:
a server gateway that receives the automatically generated near-live highlight summary of the live performance and provides access to the automatically generated near-live highlight summary of the live performance from an internet connection.

5. A system as claimed in claim 4, wherein the server gateway streams the automatically generated near-live highlight summary of the live performance to a remote device for reproduction.

6. A system as claimed in claim 5, wherein the remote device is a mobile communications terminal and the automatically generated near-live highlight summary is for reproduction on the mobile communications terminal.

7. A system as claimed in claim 1, wherein the editing action list specifies for one or more of the predetermined event codes an amount of bandwidth that is used to convey the amount of the live performance that is used to form the automatically generated near-live highlight summary.

8. An ingestion processor for generating automatically a near-live highlight summary of a live performance from live-feed signals representing a live performance produced by capturing a representation of the live performance and event codes, the event codes being selected from a set of event codes, each of the event codes in the set representing a predetermined event that is selectable by a user based on the live performance, the ingestion processor being configured to:
receive an event log including a log of the event codes and a time reference associated with each event code,
compare the event codes with a predetermined editing action list, the editing action list specifying for each of the predetermined event codes at least a predetermined period of time, and
generate automatically the near-live highlight summary of the live performance by including the predetermined period of time of the live-feed signals representative of the live performance in the near-live highlight summary in accordance with the predetermined period of time specified by the editing action list for the event code based on the comparison,
wherein the automatically generated near-live highlight summary of the performance is generated by extracting a portion of the live performance before and after the time reference based on the predetermined period of time specified for the event code by the editing action list, and
wherein the event log and time reference are stored in memory.

9. A method of generating automatically a near-live highlight summary of a live performance, the method comprising:
receiving live-feed signals representative of the live performance produced by capturing a representation of the live performance,
logging event codes, each of which is selected by a user from a set of event codes to represent one of a plurality of predetermined events that is selectable by the user based on the live performance,
receiving an event log including a log of the event codes and a time reference associated with each event code,
comparing the event codes with an editing action list, the editing action list specifying for each of the set of event codes at least a predetermined period of time, and generating automatically the near-live highlight summary of the live performance by applying the user selected event codes to the received live-feed signals representative of the live performance using the editing action list to include in the near-live highlight summary the predetermined period of time of the received live-feed signals determined for the selected event code based on the comparison,
wherein said logging logs the event codes in an event log and records a time reference at which the event code is selected by the user,
wherein said generating automatically the near-live highlight summary of the performance is performed by extracting a portion of the live performance before and after the time reference based on the predetermined period of time specified for the event code by the editing action list, and
wherein the event log and time reference are stored in memory.

10. A method as claimed in claim 9, further comprising:
storing in a buffer, a predetermined amount of the live-feed signals representative of the live performance, the predetermined amount of the stored live-feed signals representing a past section of the performance with respect to a time when the user selected an event code, and
including at least some of the live-feed signals stored in the buffer in the near-live highlight summary of the live performance in accordance with the predetermined period of time specified for at least one of the event codes by the editing action list, to provide part of the performance before the event occurred.

11. An apparatus for generating automatically a near-live highlight summary of a live performance, the apparatus comprising:
an ingestion processor configured to receive live-feed signals representative of the live performance produced by capturing a representation of the live performance,
an event processor configured to log event codes, each of which is selected by a user from a set of event codes to represent one of a plurality of predetermined events that is selectable by the user based on the live performance,
the ingestion processor being further configured to compare the event codes with an editing action list, the editing action list specifying for each of the set of event codes at least a predetermined period of time,
the ingestion processor being further configured to generate automatically the near-live highlight summary of the live performance by applying the user selected event codes to the received live-feed signals representative of the live performance using the editing action list to include in the near-live highlight summary the predetermined period of time of the received live-feed signals determined for the selected event code based on the comparison,
the event logging processor being further configured to log the one or more event codes in an event log and record a time reference at which the event code is selected by the user,
the ingestion processor being further configured to receive the event log including the event codes and the time reference associated with each event code, and to generate the near-live highlight summary of the performance by extracting a portion of the live performance before and after the time reference based on the predetermined period of time specified for the event code by the editing action list, and the event log and time reference are stored in memory.

\* \* \* \* \*